US009558060B1

(12) United States Patent
Cessac et al.

(10) Patent No.: US 9,558,060 B1
(45) Date of Patent: Jan. 31, 2017

(54) END USE SELF-HELP DELIVERY SYSTEM

(71) Applicant: Sprint Communications Company L.P., Overland Park, KS (US)

(72) Inventors: Kirk Cessac, Rio Rancho, NM (US); Shawn Gavin, Orlando, FL (US); Michael James Morgan, Olathe, KS (US); Mark L. Patten, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 208 days.

(21) Appl. No.: 14/465,831

(22) Filed: Aug. 22, 2014

(51) Int. Cl.
| | |
|---|---|
| *G06F 11/07* | (2006.01) |
| *G06F 17/30* | (2006.01) |
| *G06F 3/0484* | (2013.01) |
| *G06F 11/36* | (2006.01) |

(52) U.S. Cl.
CPC ....... *G06F 11/0793* (2013.01); *G06F 3/04842* (2013.01); *G06F 11/079* (2013.01); *G06F 11/0766* (2013.01); *G06F 11/0769* (2013.01); *G06F 17/30887* (2013.01); *G06F 11/36* (2013.01)

(58) Field of Classification Search
CPC . G06F 11/0766; G06F 11/0769; G06F 11/079; G06F 11/0793; G06F 3/04842; G06F 17/30887; G06F 11/36–11/3696
See application file for complete search history.

(56) References Cited

U.S. PATENT DOCUMENTS

| | | | | |
|---|---|---|---|---|
| 6,757,837 B1* | 6/2004 | Platt | ............. | G06F 11/0748 714/38.13 |
| 7,904,756 B2* | 3/2011 | Dilman | ............. | G06F 11/0727 714/38.1 |
| 8,913,086 B2* | 12/2014 | Meserth | ............. | G06F 17/30247 345/632 |
| 9,158,605 B2* | 10/2015 | Mishra | ............. | G06F 11/36 |
| 9,237,017 B2* | 1/2016 | Yip | ............. | H04L 9/3226 |
| 2004/0236843 A1* | 11/2004 | Wing | ............. | H04L 29/06 709/219 |
| 2007/0174693 A1* | 7/2007 | Gerber | ............. | G06F 11/0709 714/15 |
| 2010/0121520 A1* | 5/2010 | Yukawa | ............. | G06F 11/0793 701/31.4 |

(Continued)

OTHER PUBLICATIONS

Bouchenak, Sara et al. Architecture-Based Autonomous Repair Management: An Application to J2EE Clusters. 2005. 24th IEEE Symposium on Reliable Distributed Systems.*

*Primary Examiner* — Albert Decady
*Assistant Examiner* — Paul Contino

(57) ABSTRACT

A self-repairing enterprise workstation that selects a workstation repair script based on a currently experienced workstation problem, retrieves the workstation repair script from a repair script repository, and executes the retrieved repair script in a user context of the workstation to repair the problem. The self-repairing enterprise workstation comprises an automated computer repair application stored in the memory, that when launched by an operating system of the workstation in response to the receipt of an input selection of a custom URL moniker downloads a script associated with the URL moniker from a repair script repository, executes the script in a user context of the automated computer repair application, repairs a problem experienced by the self-repairing enterprise workstation.

20 Claims, 5 Drawing Sheets

(56) References Cited

U.S. PATENT DOCUMENTS

| | | | |
|---|---|---|---|
| 2012/0124419 A1* | 5/2012 | Matthew | G06F 9/4416 714/20 |
| 2014/0115108 A1* | 4/2014 | Zhang | H04L 41/5048 709/217 |
| 2014/0318560 A1* | 10/2014 | Hon | A24F 47/002 131/329 |
| 2015/0074455 A1* | 3/2015 | Li | G06F 11/0769 714/15 |
| 2015/0331779 A1* | 11/2015 | Subramaniam | G06F 11/3688 717/124 |

\* cited by examiner

END USE SELF-HELP DELIVERY SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern operating systems secure themselves by segmenting running applications from each other and from different security contexts on an operating system. A kernel is a low-level system process that controls all other processes and runs in one security context. Users of the operating system also run in their own security context. These security segments communicate with each other through well secured programming interfaces. Many of the low-level system management functions are exposed to both inter-process (locally on the operating system) and remote procedure calls (available over a network connection), while user level functions are exposed in users' security context via inter-process procedure calls.

SUMMARY

In an embodiment, a self-repairing enterprise workstation that selects a workstation repair script based on a currently experienced workstation problem, retrieves the workstation repair script from a repair script repository, and executes the retrieved repair script in a user context of the workstation to repair the problem is disclosed. The self-repairing enterprise workstation comprises a processor, a memory, a web browser application stored in the memory, and an automated computer repair application stored in the memory. When executed by the processor, the web browser application receives an input selection of a custom uniform resource locator (URL) moniker presented in a web page. When executed by the processor, the automated computer repair application, when launched by an operating system of the workstation in response to the receipt of the input selection of the custom URL moniker, downloads a script associated with the URL moniker from a repair script repository, wherein the repair script repository stores a plurality of repair scripts and stores the script in a process memory space of the automated computer repair application in volatile memory. The automated computer repair application further executes the script in a user context of the automated computer repair application and repairs a problem experienced by the self-repairing enterprise workstation. The automated computer repair application further captures the results of the script execution, packages the results in a report, sends the report to an external server, wherein the external server parses the report so that it is user readable as a fix outcome message, receives the fix outcome message from the external server, and presents the fix outcome message on a display coupled to the workstation, wherein the fix outcome message details what was accomplished by the automated computer repair application.

In an embodiment, a method of troubleshooting computer issues with an application is disclosed. The application comprises receiving an input selection of a custom uniform resource locator (URL) moniker presented in a web page by a web browser application via an enterprise workstation, in response to the selection of the custom URL moniker, launching an automated computer repair application by an operating system of the workstation that is responsive to the selection of the custom URL moniker to execute in an user context of the workstation, downloading a script by the automated computer repair application, and storing the script by the automated computer repair application in a process memory space of the automated computer repair application. The method further comprises executing the script in a user context of the automated computer repair application, repairing, by execution of the script in the user context, a problem experienced by the workstation, capturing the results of the script execution by the automated computer repair application. The method further comprises packaging the results in a report by the automated computer repair application, sending the report by the automated computer repair application to an external server, wherein the external server parses the report so that it is user readable as a fix outcome message, receiving the fix outcome message by the automated computer repair application from the external server, and presenting the fix outcome message by the automated computer repair application on a display coupled to the workstation, wherein the fix outcome message details what was accomplished by the automated computer repair application.

In an embodiment, another method of troubleshooting computer issues with an application is disclosed. The method comprises, sending a selection of a custom uniform resource locator (URL) moniker presented in a web page by a web browser application via an enterprise workstation and launching an automated computer repair application by an operating system of the workstation in response to the selection of the custom URL moniker to execute in a user context of the workstation. The method further comprises downloading a script by the automated computer repair application, wherein the script is stored in volatile memory of the automated computer repair application and receiving a user readable fix outcome message from an external server via the workstation, wherein the fix outcome is a parsed script that informs the workstation what executing the script has accomplished.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
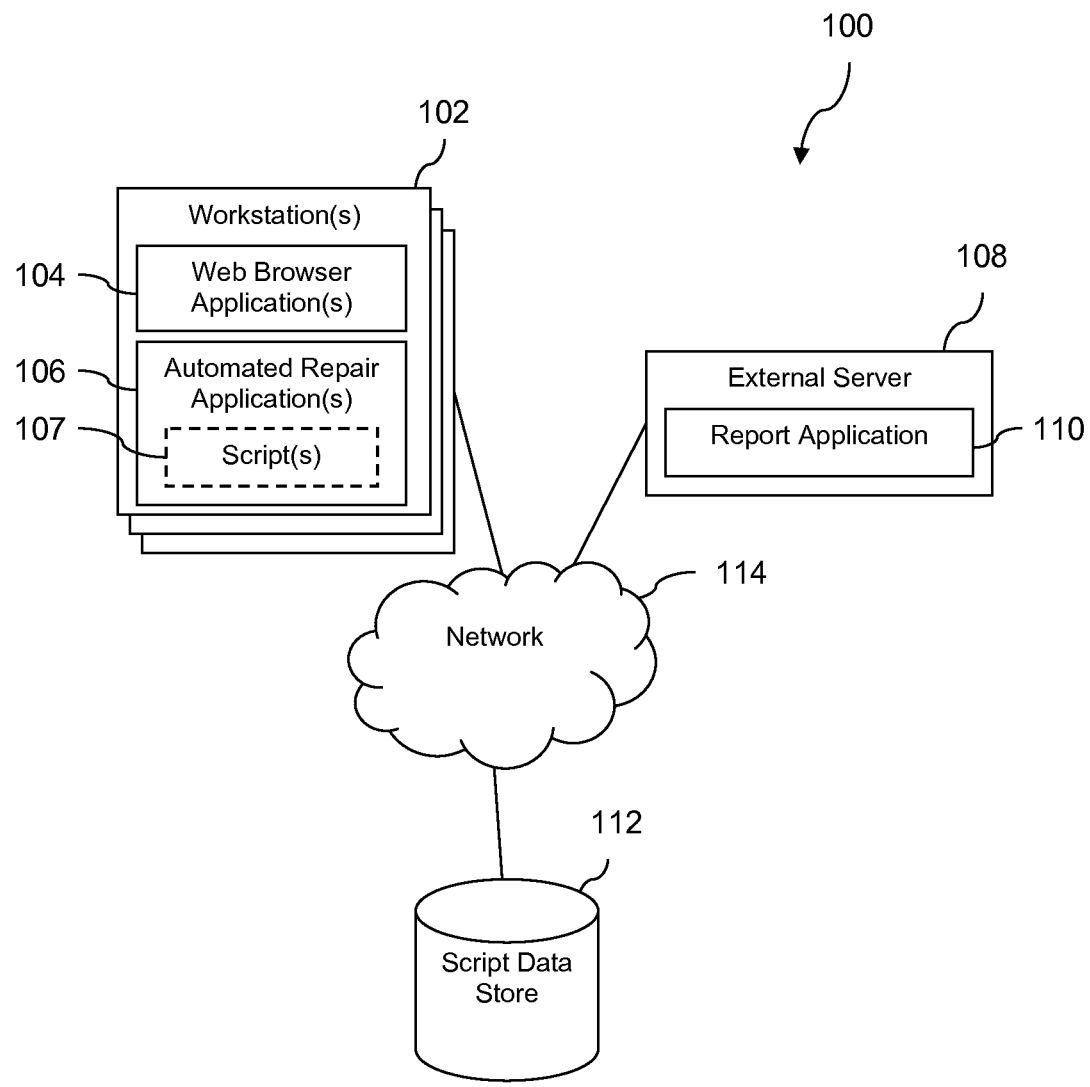
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure provides a system and methods for a locally executing automated computer repair application. Prior to the implementation of the automated computer repair application, corporations often relied on system administrators to fix computer issues that arose for employee workstations. While system administrators can effectively manage systems through remote procedure calls, it can be difficult to help manage and troubleshoot user level functionality, i.e., it may be difficult as a system administrator to diagnose a user issue because they are working from a remote location and cannot directly see the issue, instead relying on a description from the user. Troubleshooting on a user level may take remote control software, coordination of time between users and system administrators, and system administrators guiding users through a series of technical steps to fix computer issues. This process can be tedious and time consuming. The automated computer repair application offers a secure delivery mechanism for self-help automation solutions via web based content to users and without having to request the assistance of a system administrator.

In an embodiment, the system may comprise a plurality of enterprise workstations, each of which may further comprise a web browser application. The web browser application receives an input selection of a custom uniform resource locator (URL) moniker presented in a computer repair web page. In an embodiment, the custom URL moniker begins with esc://. The custom URL may also begin with other symbols or other literal strings. The system may further comprise an automated computer repair application installed on the workstation. For example, a user of an enterprise workstation experiencing a computer problem on that workstation navigates to an enterprise workstation self-help web page and selects a self-help option that he or she deems to be appropriate to fix the problem.

The automated computer repair application is launched by an operating system of the workstation in response to the selection of the custom URL moniker to execute in a user context and/or a user environment of the workstation. As is appreciated by one skilled in the art, executing logic instructions in a user context means the subject instructions execute with user rights. The user may command execution of the script by selecting the custom URL moniker that may be displayed on the self-help web page. The automated computer repair application downloads a script that is identified by the custom URL, wherein the script fixes computer issues. The automated computer repair application stores the script in a process memory space of the automated computer repair application in volatile memory, for example in heap memory or some other transient memory allocated to the repair application. By storing the script in volatile memory or transient memory, attacks from potentially malicious users may be reduced because the script is stored transiently. The automated computer repair application then executes the script in the process context of the automated computer repair application. The automated computer repair application then captures the results of the script execution. The automated computer repair application then packages the results in a report and sends the report to an external server. The external server analyzes the report and generates a user readable fix outcome message. The automated computer repair application then receives the fix outcome message from the external server and presents the fix outcome message on a display coupled to the workstation.

Turning now to FIG. 1, a communication system 100 is described. The system 100 comprises a plurality of workstations 102. The plurality of workstations 102 further comprise a web browser application 104 and an automated computer repair application 106 stored in a memory of the plurality of workstations 102. The automated computer repair application 106 may further temporarily comprise a script 107. The script 107 is only temporarily stored in transient memory, for example, in a dynamically allocated process context of the repair application 106, as suggested by the dotted line box representing the script 107 in FIG. 1. The script 107 may be a programming language that executes particular functions. The system 100 further comprises an external server 108 which further comprises a report application 110. The system 100 also comprises a script data store 112 and a network 114. The plurality of workstations may be desktop computers, laptop computers, tablet computers, or other computers. In an embodiment, the plurality of workstations 102, the external server 108, and the script data store 112 may be communicatively coupled to the network 114. In an embodiment, the network 114 may be a private communication network, a public communication network, or a combination thereof.

In an embodiment, the plurality of workstations 102 may represent servers, personal computers, or other types of computer that a user may work on. The web browser application 104 may be a preloaded application that a user may launch in order to access the network 114. The web browser application 104 may also be responsive to an input selection of a custom uniform resource locator (URL) moniker presented in a web page. The automated computer repair application 106 may fix computer issues that occur on the plurality of workstations 102 by executing scripts such as the script 107 that it obtains from the script data store 112. The report application 110 of the external server 108 receives script execution reports from the automated computer repair application 106 and parses the script execution reports into fix outcome messages that it sends to the plurality of workstations 102. The script data store 112 is comprised of a plurality of scripts such as the script 107.

In an embodiment, the web browser application 104 is executed by a processor of the workstation 102, wherein the web browser application 104 receives an input selection of the custom URL moniker presented in a web page. In an embodiment, the custom URL moniker may be one of a plurality of links on the web page that may match potential computer issues that affect the workstation 102. In an embodiment the custom URL moniker address may begin with esc://. The custom URL moniker may also begin with other symbols and/or literal strings. In an embodiment, the custom URL moniker may not use hypertext transfer protocol secure (https://) but may use esc://. In an embodiment esc:// may stand for enterprise solutions center.

Triggered by the input selection of the custom URL moniker, an operating system of the workstation 102 launches the automated computer repair application 106. In an embodiment, the operating system of the workstation 102 may be configured to know to launch the automated computer repair application 106 when the associated custom URL moniker is invoked. In an embodiment, the automated computer repair application 106 executes locally in a user context of the workstation 102. In an embodiment, the custom URL moniker may be common and launch the automated computer repair application 106 in the user context of the workstation 102.

Once launched, the automated computer repair application 106 downloads a script 107 from the data store 112 based on the custom URL moniker. In an embodiment, the scripts of the script data store 112 may be temporarily stored to a memory of the workstation 102, for example in a transient memory location or a transitory memory location, for example in a process space or in a heap space of the repair application 106. Once downloaded, the automated computer repair application 106 then stores the script 107 in a process memory space of the automated computer repair application 106. In an embodiment, the automated computer repair application 106 may not store the script 107 in non-transient memory, but may store the script 107 in volatile/transient memory. The script 107 may not be susceptible to tampering by potentially malicious users due to the transient storage of the script 107. The automated computer repair application 106 then executes the script 107. In an embodiment, the script 107 may take corrective actions when executed; these corrective actions may include one or more of deleting cookies, fixing corrupted folders and files, fixing broken desktop shortcuts, and fixing other computer issues In an embodiment, the scripts in the script data store 112 may be updated by a system administrator that accesses the script data store 112 and may be readily available for execution after they have been updated. Because the web page is pulled down from a content site when the user activates the web self-help page, any update of the web pages will promptly be effective and take effect. In an embodiment, the automated computer repair application 106 may restrict the execution of unknown executable files (.exe) and may alert a system administrator if there is an attempt to execute an unknown executable file.

After executing the script 107, the automated computer repair application 106 captures and packages the results of the script 107 execution and transmits the results of the script 107 execution to the report application 110 of the external server 108. The report application 110 of the external server 108 parses the script 107 execution report and reformats it so that it is user readable as a fix outcome message. In an embodiment, the automated computer repair application 106 may capture the results of the script 107 execution by taking a snapshot. In an embodiment, the automated computer repair application 106 may be able parse the results of the script 107 execution itself. The automated computer repair application 106 receives the fix outcome message from the report application 110 of the external server 108 and presents the fix outcome message on a display coupled to the workstation 102. In an embodiment, the automated computer repair application 106 may display the fix outcome message by launching a web page after the script 107 execution where a user may see the results of the script 107 execution.

Figure 2A:
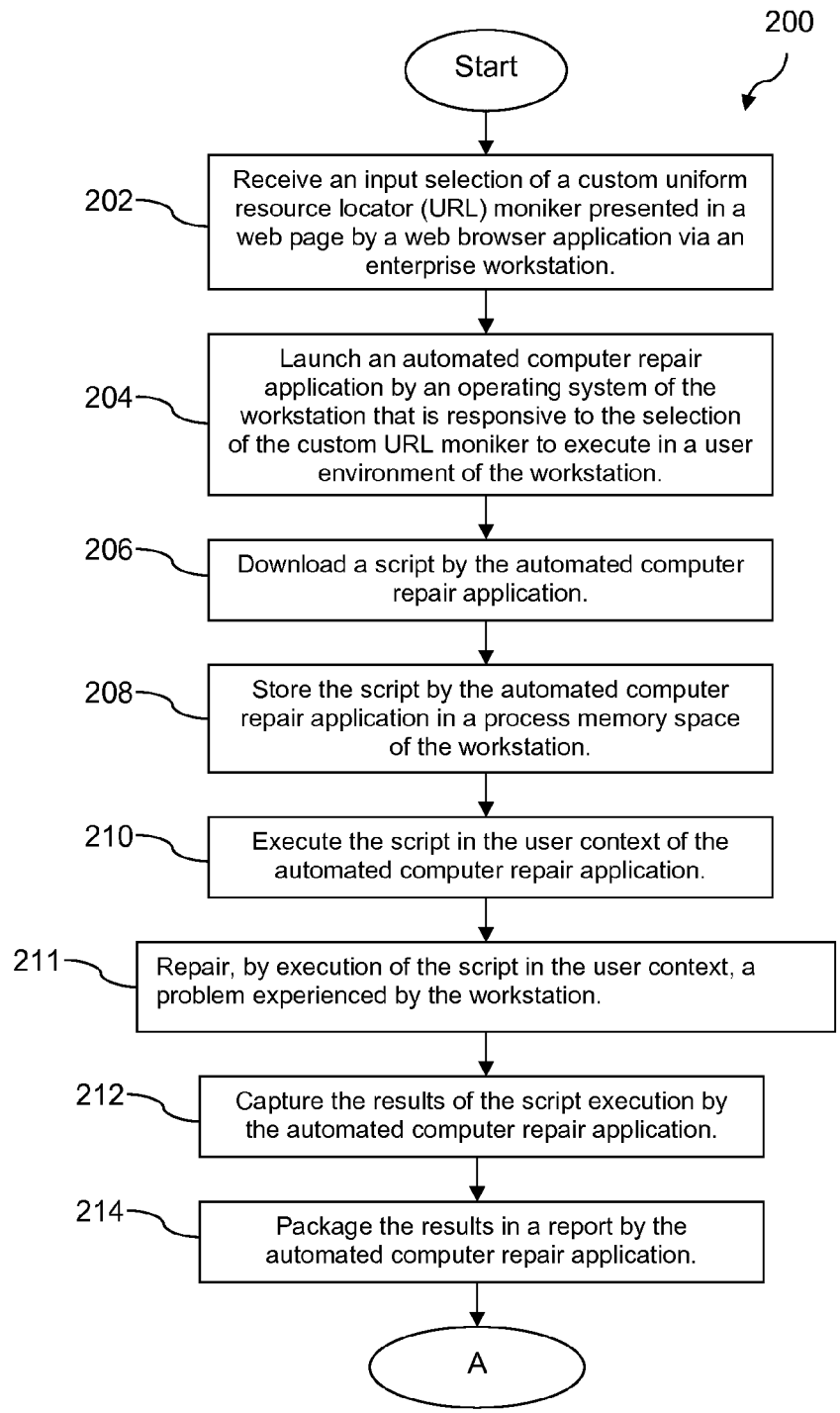
FIG. 2a is a flow chart of a method according to an embodiment of the disclosure.
Figure 2B:
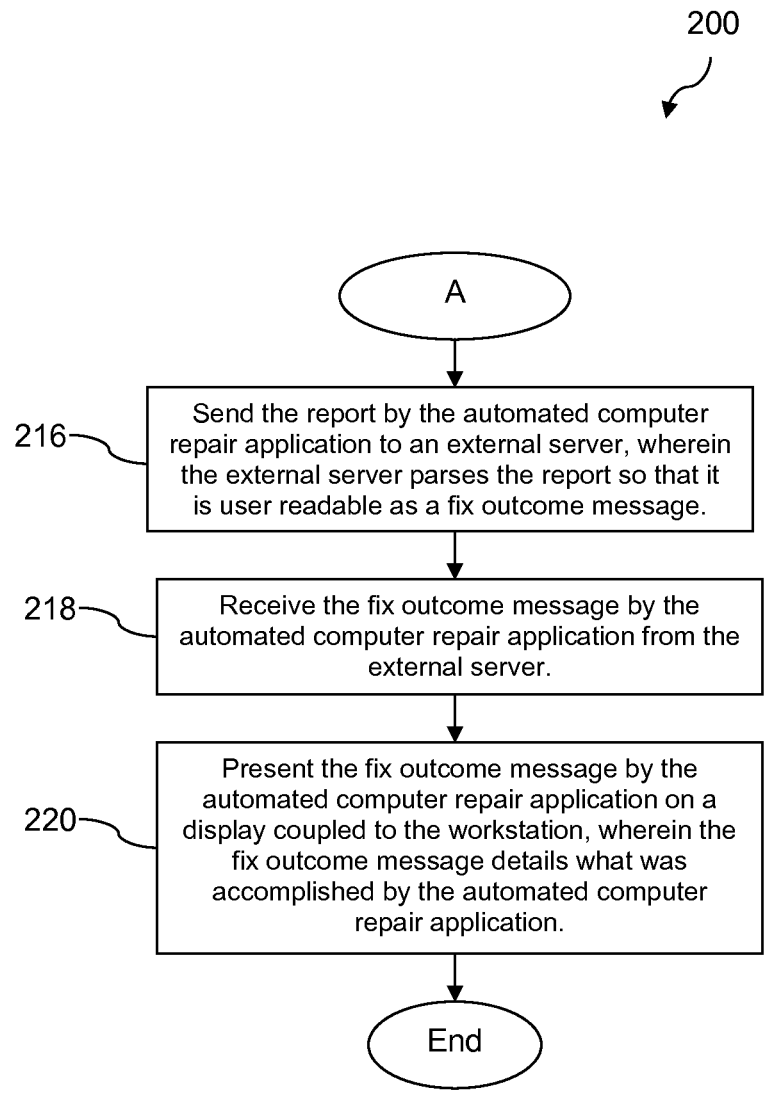
FIG. 2b is a flow chart of a method according to an embodiment of the disclosure.

In FIG. 2a and FIG. 2b, a method 200 is described. At block 202, a web browser application receives an input selection of a custom uniform resource locator (URL) moniker presented in a web page by an enterprise workstation. At block 204, in response to the selection of the custom URL moniker, an operating system of the workstation that is responsive to the selection of the custom URL moniker launches an automated computer repair application to execute in a user context of the workstation. At block 206, the automated computer repair application downloads a script from an external data store based on the custom URL moniker. At block 208, the automated computer repair application stores the script in a process memory space in volatile memory of the automated computer repair application. At block 210, the automated computer repair application executes the script in the user context of the workstation. At block 211, repair, by execution of the script in the user context, a problem experienced by the workstation. At block 212, the automated computer repair application captures the results of the script execution. At block 214, the automated computer repair application packages the results in a report. At block 216, the automated computer repair application sends the report to an external server, wherein the external server parses the report so that it is user readable as a fix outcome message. At block 218, automated computer repair application receives the fix outcome message from the external server. At block 220, the automated computer repair application presents the fix outcome message on a display coupled to the workstation.

Figure 3:
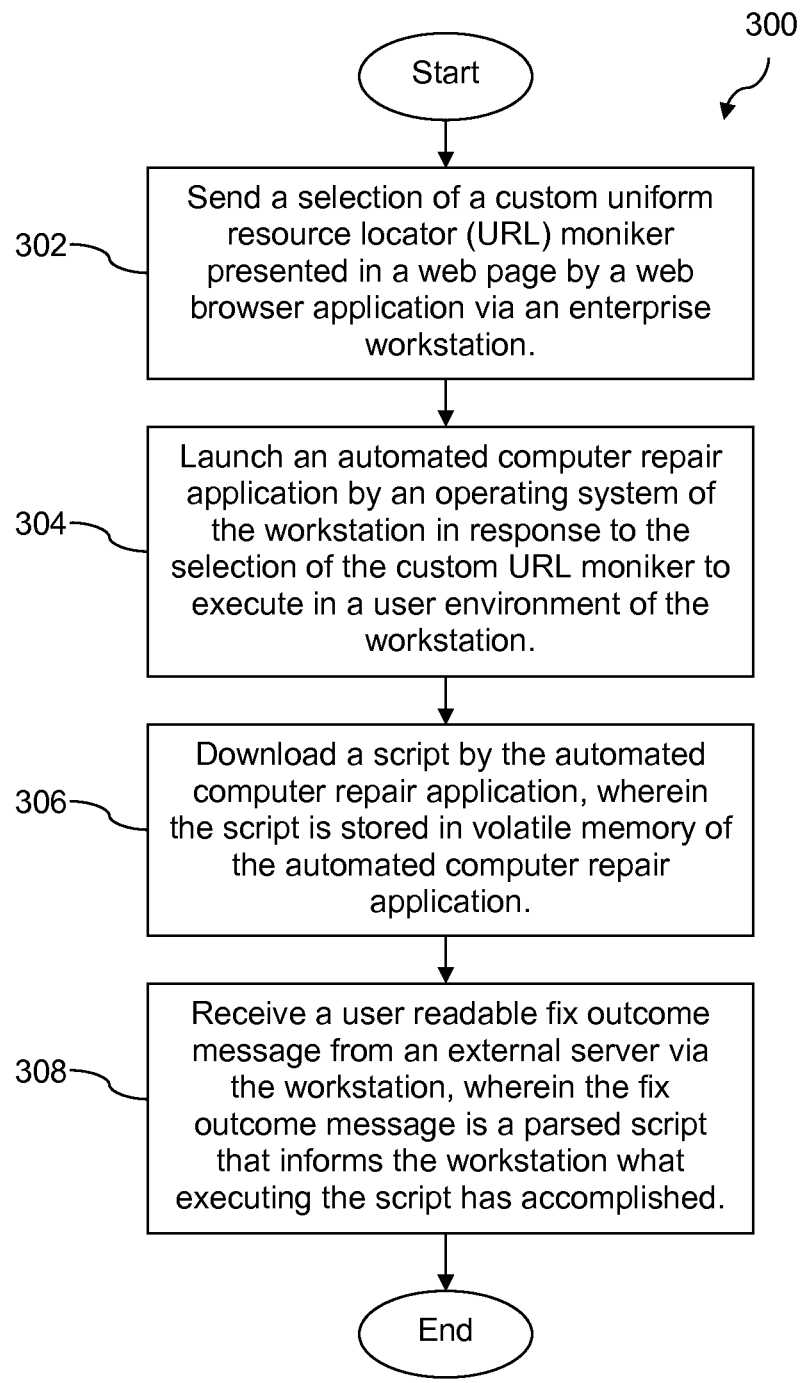
FIG. 3 is a flow chart of a method according to an embodiment of the disclosure

In FIG. 3, a method 300 is described. At block 302, a web browser application sends a selection of a custom uniform resource locator (URL) moniker presented in a web page via an enterprise workstation. At block 304, an operating system of the workstation that is responsive to the selection of the custom URL moniker launches an automated computer repair application in a user context of the workstation. At block 306, the automated computer repair application downloads script, wherein the script is stored in volatile memory of the automated computer repair application. At block 308, the workstation receives a user readable fix outcome message from an external server, wherein the fix outcome message is a parsed script that informs the workstation what executing the script has accomplished.

Figure 4:
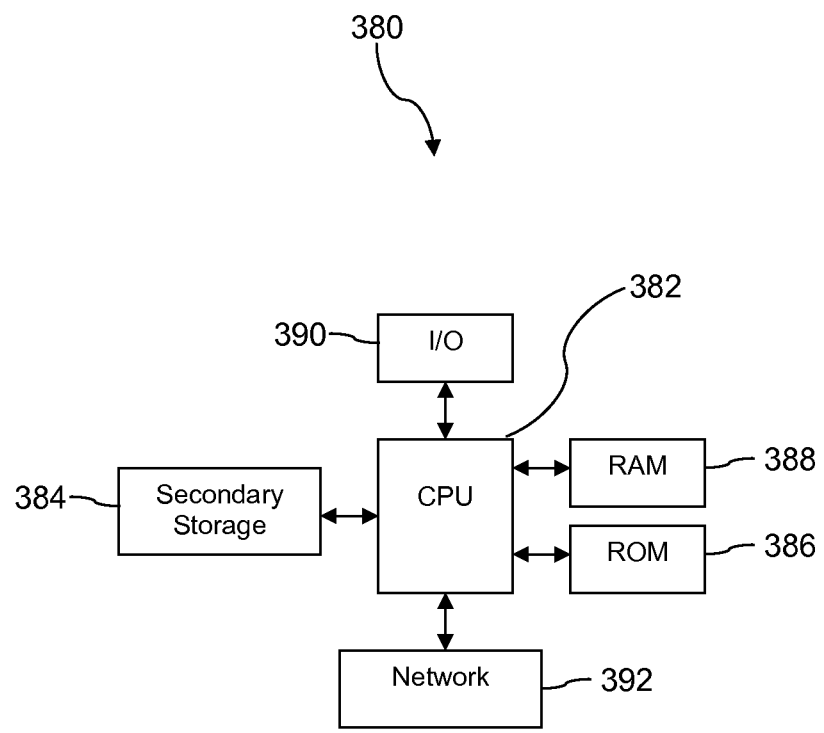
FIG. 4 illustrates an exemplary computer system suitable for implementing the several embodiments of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A self-repairing enterprise workstation that selects a workstation repair script based on a currently experienced workstation problem, retrieves the workstation repair script from a repair script repository, and executes the retrieved repair script in a user context of the self-repairing enterprise workstation to repair the problem, the self-repairing enterprise workstation comprising:
    a processor,
    a non-transitory memory,
    a web browser application stored in the non-transitory memory that, when executed by the processor,
        receives a selection of a custom uniform resource locator (URL) moniker presented in a web page, and
        in response to selection of the custom URL, triggers an operating system of the self-repairing enterprise workstation to launch an automated computer repair application, and
    the automated computer repair application stored in the non-transitory memory, that when launched by the operating system of the self-repairing enterprise workstation in response to the receipt of the selection of the custom URL moniker,
        downloads a script that is identified by the custom URL moniker from a repair script repository, wherein the repair script repository stores a plurality of repair scripts,
        stores the script in a process memory space of the automated computer repair application in volatile memory,
        executes the script in a user context of the automated computer repair application,
        repairs a problem experienced by the self-repairing enterprise workstation,
        captures the results of the script execution,
        packages the results in a report,
        sends the report to an external server, wherein the external server parses the report so that it is user readable as a fix outcome message,
        receives the fix outcome message from the external server, and
        presents the fix outcome message on a display coupled to the self-repairing enterprise workstation, wherein the fix outcome message details what was accomplished by the automated computer repair application.

2. The method of claim 1, wherein the custom URL moniker is one of a plurality of links on the web page that match computer issues that the self-repairing enterprise workstation experiences.

3. The method of claim 1, wherein the custom URL moniker address begins with esc://.

4. The method of claim 1, wherein the script is not stored in non-transient memory.

5. The method of claim 1, wherein the automated computer repair application executes locally in the user context of the self-repairing enterprise workstation.

6. The method of claim 1, wherein the script does one of delete cookies, fixing corrupted files or folders, and fixing broken desktop shortcuts.

7. The system of claim 1, wherein the automated computer repair application further restricts, by executing the script, execution of at least one executable file on the self-repairing enterprise workstation, and wherein the at least one executable file is not recognized by the automated computer repair application.

8. A method of troubleshooting and repairing computer issues with an application executing on a self-repairing workstation, comprising:
    receiving, via a self-repairing enterprise workstation, a selection of a custom uniform resource locator (URL) moniker presented in a web page by a web browser application;
    in response to the selection of the custom URL moniker, launching, by an operating system of the self-repairing enterprise workstation, an automated computer repair application that executes in an user context of the self-repairing enterprise workstation;
    downloading, by the automated computer repair application, a script that is identified by the custom URL from a repair script repository;
    storing, by the automated computer repair application, the script in a process memory space of the automated computer repair application;

executing, by the automated computer repair application, the script in a user context of the automated computer repair application;

repairing, by execution of the script in the user context, a problem experienced by the self-repairing enterprise workstation;

capturing the results of the script execution by the automated computer repair application;

packaging the results in a report by the automated computer repair application;

sending, by the automated computer repair application, the report to an external server, wherein the external server parses the report so that it is user readable as a fix outcome message;

receiving, by the automated computer repair application, the fix outcome message from the external server; and presenting the fix outcome message by the automated computer repair application on a display coupled to the self-repairing enterprise workstation, wherein the fix outcome message details what was accomplished by the automated computer repair application.

9. The method of claim 8, wherein the automated computer repair application stores the downloaded script in volatile memory.

10. The method of claim 8, wherein the custom URL moniker is one of a plurality of links that match potential computer issues of the self-repairing enterprise workstation that launches the automated computer repair application.

11. The method of claim 8, wherein repairing by executing the script in the user context comprises at least one of deleting cookies, fixing corrupted folders and files, and fixing broken desktop shortcuts.

12. The method of claim 8, wherein the scripts that are downloaded are located in a script data store.

13. The method of claim 11, wherein the scripts that are downloaded are updated by a system administrator that accesses the scripts in the script data store and are readily accessible after they have been updated.

14. The method of claim 8, wherein the self-repairing enterprise workstation is a desktop computer, a laptop computer, or a tablet computer.

15. A method of troubleshooting and repairing computer issues with an application executing on a self-repairing enterprise workstation, comprising:

sending, by a self-repairing enterprise workstation, a selection of a custom uniform resource locator (URL) moniker presented in a web page by a web browser application to an operating system of the workstation;

launching an automated computer repair application by the operating system of the self-repairing enterprise workstation in response to the selection of the custom URL moniker to execute in a user context of the self-repairing enterprise workstation;

downloading, by the automated computer repair application, a script that is identified by the custom URL moniker, wherein the script is stored in volatile memory of the automated computer repair application;

repairing, from volatile memory on the self-repairing enterprise workstation, a problem experienced by the self-repairing enterprise workstation by executing the script identified by the custom URL moniker, wherein results from the repairing are sent to an external server; and receiving a user readable fix outcome message from the external server via the self-repairing enterprise workstation, wherein the fix outcome is a parsed script that informs the self-repairing enterprise workstation what executing the script has accomplished.

16. The method of claim 15, wherein the automated computer repair application stores the downloaded script in a process memory space of the automated computer repair application.

17. The method of claim 15, wherein the operating system of the self-repairing enterprise workstation is modified to know to launch the automated computer repair application when the custom URL moniker is invoked.

18. The method of claim 15, wherein the automated computer repair application launches a web page after the script execution where a user sees the results of the script execution.

19. The method of claim 15, wherein the custom URL moniker launches the automated computer repair application in the user context.

20. The method of claim 15, wherein the custom URL moniker does not use hypertext transfer protocol secure (https://), but instead the custom URL moniker comprises esc://.

* * * * *